Patented Nov. 24, 1936

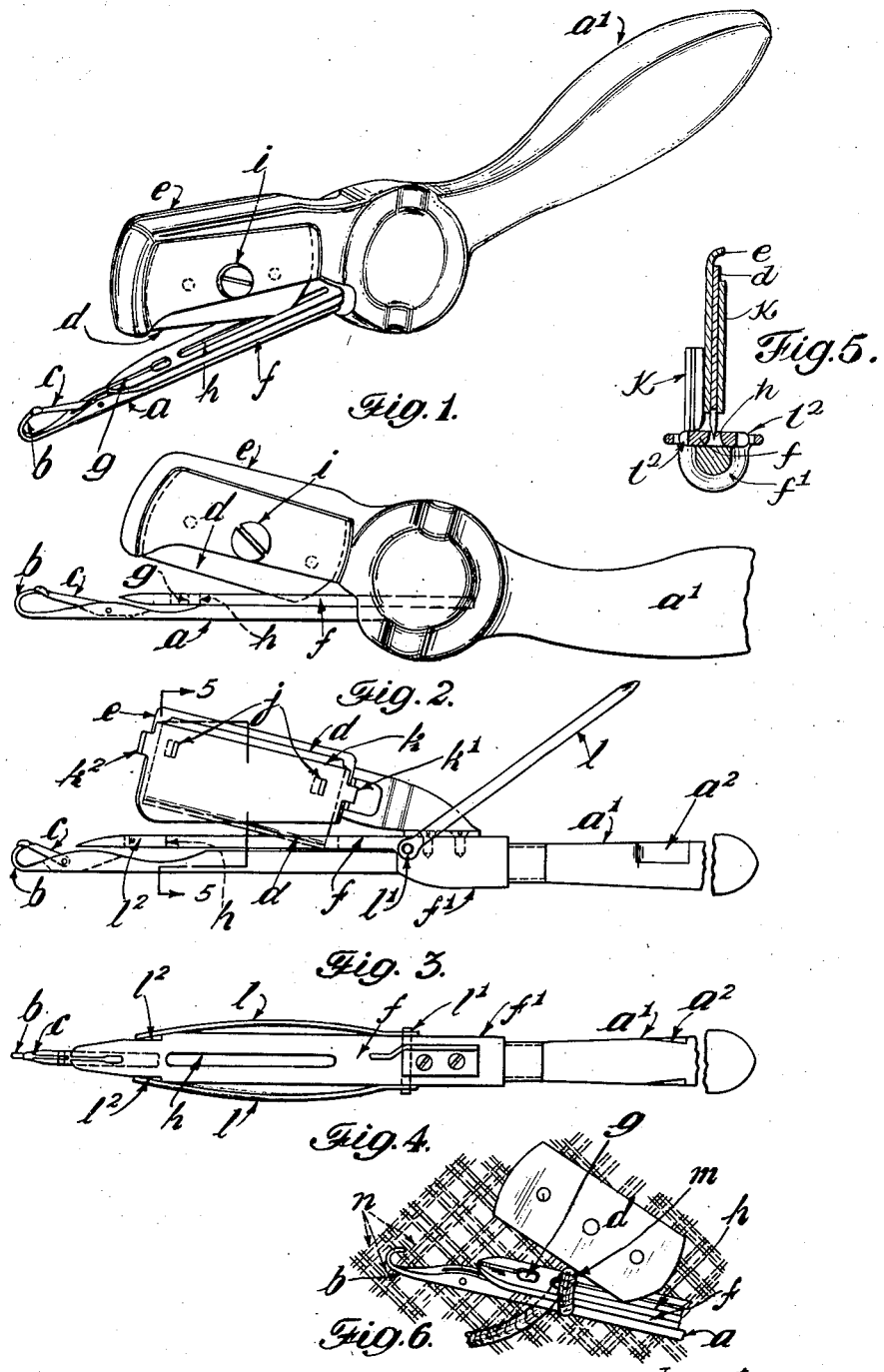

2,061,766

UNITED STATES PATENT OFFICE 2,061,766

RUG-MAKING TOOL

David Hooker Hannay, Cheadle Hulme, Cheshire, England

Application March 26, 1936, Serial No. 70,960
In Great Britain March 25, 1935

7 Claims. (Cl. 112—80)

This invention relates to rugmaking tools of the kind by which lengths of wool are drawn through the interstices of a canvas backing in order that they may be looped and cut to form a cut pile. The invention is particularly applicable to tools of the latch-hook type, but is not intended to be limited thereto.

Hitherto, in the making of cut-pile rugs by hand, it has been the practice either to cut the wool into short lengths before it is drawn through the canvas, or to use a continuous length of wool to make a looped-pile rug and then to cut the loops as a second and distinct operation, say by means of a pair of scissors, or by means of special tools made for the purpose.

The object of this invention is to provide rug-making tools which will combine the loop forming and loop cutting operations, thereby eliminating the second separate operation, and also dispensing with the preliminary cutting operation.

According to the invention the tool has combined with it a blade or cutter disposed so as to cut the loop last formed, during the operation of making the next loop.

As applied to a rug-making tool of the latch-hook type, the tool incorporates a cutter in rear of the latch, the cutter being adapted to cut, during the forward movement of the tool, the loop of fabric previously formed by the tool during the rug-making operation. Preferably the cutter is in all cases removable and replaceable and may comprise a cutting blade secured in a holder attached to the shank or handle of the tool.

Conveniently the cutting blade co-operates with a guide in such a manner as to provide between the cutting edge of the blade and the guide a V-shaped or divergent notch opening towards the latch, so that the loop of yarn formed by the tool is received in said notch and is severed therein by the cutting blade as the loop of yarn approaches the base of the notch, during forward movement of the tool.

The invention enables the tool to cut successive loops of yarn into pile in the act of moving the tool forward in readiness for the formation of the next loop.

The said guide may be interchangeable with guides of other sizes, to vary the size of the loop, or removable loop-enlarging attachments may be added to the tool.

In the accompanying drawing:—

Fig. 1 is a perspective view of one form of hand tool incorporating the invention, and Fig. 2 is a side view of the same.

Fig. 3 is a side view of another form of tool incorporating the invention.

Fig. 4 is a plan of the tool shown in Fig. 3 with the cutter and cutter holder omitted, and with the loop-enlarging means in operative position.

Fig. 5 is a sectional view through the tool shown in Fig. 3.

Fig. 6 is a diagrammatic perspective view showing the tool in operation.

As shown, in Figs. 1 and 2, the tool comprises the usual metal shank $a$ with hook $b$ and latch $c$ at one end, and a handle $a^1$ at the opposite end.

In carrying out the invention the tool incorporates a cutter or cutting blade $d$ mounted in rear of the latch $c$ in a holder $e$ moulded in one with the handle $a^1$ of the tool. The blade $d$ co-operates with a guide $f$ fixed to the tool handle $a^1$ and is mounted so that a V-shaped or divergent notch, open towards the latch, is formed between the edge of the blade $d$ and the guide $f$.

In the construction shown the guide $f$ is substantially parallel to the shank $a$ of the tool and extends from the handle $a^1$ to the latch $c$, the guide being placed above the shank and at a distance therefrom sufficient to allow the threads or strings of the woven rug backing to pass between the shank and guide. The outer end of the guide $f$ is bifurcated or slotted as at $g$ to allow the latch $c$ to pass therethrough, and a further slot $h$ is provided intermediate the ends of the guide $f$. The guide $f$ may be screwed or otherwise secured in the handle $a^1$ and may be interchangeable with larger or smaller (i. e. wider or narrower) guides, according to the desired length of the loop.

The cutter may comprise a safety razor blade, and will usually be a double-edged blade, the holder $e$ having provision for engaging the usual stud holes of the blade, and having a screw and nut $i$ for securing the blade in position. Other types of blade, and other securing means may be adopted.

Referring now to Figs. 3, 4 and 5, the blade $d$ is carried in a holder which is secured by screws to an enlargement $f^1$ of the guide $f$.

The blade in this case is held in position on the holder by means of two or more projections $j$ on the holder engaging corresponding holes in the cutter or blade $d$. A clamping plate $k$ hinged at one end $k^1$ to the holder, and carrying a clip fastener $k^2$ at the other end, serves to secure the blade on the holder, the clip fastener $k^2$ being adapted to engage the edge of the holder whereby the cutter or blade is clamped between the holder and clamping plate. The holder $e$ is so positioned on the tool, that the cutting edge of the cutter or blade $d$ forms an angle with the guide $f$, the end of the cutter or blade projecting below the lower edge of the holder into the slot $h$, so that each loop of the yarn is severed as the tool is passed through said loop.

In order that the length of the loop and subsequently the length of the pile may be varied, the tool may be fitted with a pair of members $l$ which are pivoted at $l^1$ to the enlarged end $f^1$ of the guide $f$, said members $l$ being adapted to be either turned into the position shown in Fig. 4 where their ends engage in recesses $l^2$ in the guide $f$ or into the position shown in Fig. 3, or still further back so that their ends engage in further recesses $a^2$ (Fig. 3) in the handle $a^1$.

The loop-enlarging members $l$ illustrated in Figs. 3 and 4, may be applied to the form of tool shown in Figs. 1 and 2, if desired, as an alternative to the substitution of differently sized guides $f$.

The tool operates as follows:—

The loop $m$ of the yarn is formed in the usual way by passing the end of the shank $a$ with hook $b$ and latch $c$ through the open-woven backing, beneath a pair of threads $n$, thereafter threading the yarn into the hook and latch and withdrawing the shank $a$, whereby the loop $m$ is formed, the loop being knotted on the finger and thumb of the user, if required, and pulled tight to prevent the yarn being drawn back through the backing. The shank $a$ and guide $f$ are then passed forward through the loop $m$ and the shank is moved forward through the backing beneath the next pair of threads $n$, so that as the tool is pushed farther through the backing the loop $m$ slides along the guide $f$ whilst the threads $n$ pass between the shank $a$ and the guide $f$, see Fig. 6. The forward movement of the tool brings the cutting edge of the cutter or blade $d$ into engagement with the loop $m$ which it severs, and thereafter the yarn is again threaded into the hook and latch of the shank $a$ and the tool withdrawn to form another loop.

The width of the guide $f$ regulates the length of the pile, since the loop is enlarged as it passes along the guide from the tapered end towards the broader portion at which it is severed. The slot $h$ facilitates the severing by the blade of the loop or yarn, which is stretched across said slot, and the latter further serves to allow any loose cuttings to drop through the guide, thereby preventing them from accumulating between the guide and the edge of the blade. The length of the pile can be varied by turning the members $l$ into the position shown in Fig. 4, whereby the loop is further enlarged as it passes over the guide $f$ and members $l$.

It is to be understood that the invention is not restricted to the constructions of tool illustrated and described as it will be apparent that the construction may be varied without departing from the scope of the invention. For instance, the shank $a$, guide $f$ and handle $a^1$ might be assembled together by other means than that shown, or they may be made integral with one another, or the guide $f$ might be integral either with the shank $a$ or the handle $a^1$. Moreover, the cutter or cutting blade $d$ may be mounted in any convenient form of holder other than those shown, or according to the shape of the cutting blade, and instead of the blade being detachably mounted in the holder, it could be detachably secured to the tool, and may be adapted for longitudinal adjustment along the tool.

The rug backing illustrated in Fig. 6 is composed of double weft and double warp threads, but the tool can be employed with equal facility with rug backing having single weft and warp threads or having the backing woven in any other manner.

Whilst described chiefly as applied to tools of the latch-hook type of tool, the invention is also applicable to tools of other types in which the loops of fabric are to be drawn through a fabric backing from the under side. For instance, it may be applied to a tool of the "pliers" type having a pivoted spring-pressed jaw to grip the wool, the cutter and guide in this case being carried from the shank of the tool, or from the pivoted member, or one from the former, and the other from the latter.

What I claim is:—

1. A hand tool for rug-making, comprising a handle, a shank extending from the handle for reciprocation through successive interstices of a woven rug-backing, a hook on the end of the shank for drawing a loop of yarn through such interstices and then releasing it, and a cutter blade carried by the handle having its cutting edge at an acute angle to the shank and facing the hook so as to sever a loop released from the hook and passed along the shank.

2. A rug-making tool having in combination a shank, means on said shank for drawing a length of yarn through a woven backing to form a loop, guide means parallel with and moving with said shank for entering the loop last formed, and a cutter also moving with the shank for severing such last formed loop whilst stretched on the guide means.

3. A rug-making tool comprising a reciprocating member with a latch and hook at one end, and having a cutter carried on and moving with such member, in rear of the latch, and adapted to cut, during the forward movement of the said member, the loop of fabric previously formed by the tool during the rug-making operation.

4. A rug-making tool comprising a handle, a shank extending forwardly from the handle and having a hook at its outer end for drawing a loop of yarn through a woven backing, a slotted guide detachably carried by the handle parallel with and just above the shank for entering a loop of yarn released from the hook, an extension of the handle overlying said guide, and a cutter blade removably carried in such extension with its cutting edge at an angle to the guide and facing the hook, the lower end of the cutter entering the slot in the guide.

5. A rug-making tool comprising a hook-ended member for drawing a loop of yarn through a rug-backing, and a cutter blade mounted thereon with its cutting edge forming a V-shaped notch with the said member open towards the hook.

6. A rug-making tool having a shank for reciprocation through successive interstices of a woven backing, a latch and hook on the forward end of the shank for engaging a length of yarn and pulling it through the backing to form a loop, a slotted guide on the tool substantially parallel with the shank for entering and stretching the loop last formed and a cutter, in a holder carried by the tool, and disposed so as to form with the guide a V-shaped notch open towards the latch and hook, the lower end of the blade entering the slot in the guide.

7. A rug-making tool according to claim 6, and including spring arms pivotally connected to the sides of the tool, means for retaining such arms one at each side of the guide, to increase its effective width, and further means to retain the arms one at each side of the handle of the tool out of operative position.

DAVID HOOKER HANNAY.